Nov. 25, 1952     J. F. HANSEN     2,618,918
MOWER ATTACHMENT FOR TRACTORS
Filed Sept. 23, 1948     2 SHEETS—SHEET 1
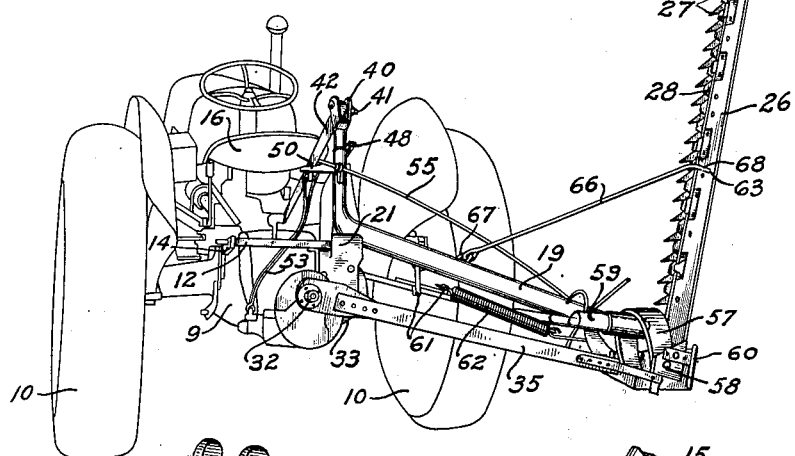
INVENTOR.
Joseph F. Hansen
BY
Lieber & Lieber
ATTORNEYS.

Nov. 25, 1952  J. F. HANSEN  2,618,918
MOWER ATTACHMENT FOR TRACTORS
Filed Sept. 23, 1948  2 SHEETS—SHEET 2
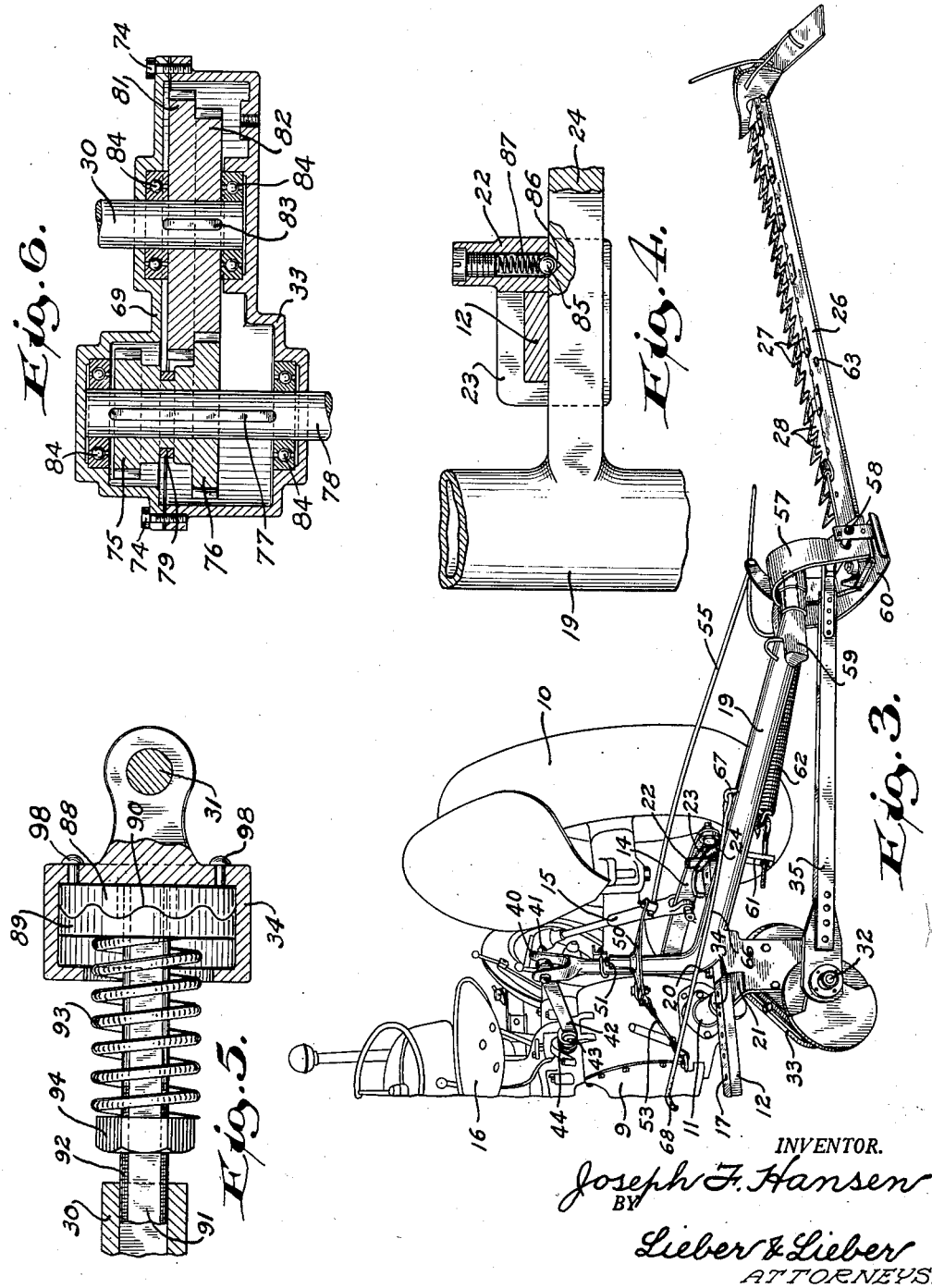
INVENTOR.
Joseph F. Hansen
BY
Lieber & Lieber
ATTORNEYS.

Patented Nov. 25, 1952

2,618,918

UNITED STATES PATENT OFFICE 2,618,918

MOWER ATTACHMENT FOR TRACTORS

Joseph F. Hansen, Sheboygan, Wis.

Application September 23, 1948, Serial No. 50,739

7 Claims. (Cl. 56—25)

My invention relates generally to improvements in agricultural implements, and relates more specifically to improvements in the construction and operation of mower attachments for farm tractors and the like.

The primary object of the present invention is to provide an improved mower attachment for farm tractors, which is simple but durable in construction and flexible in its adaptations, while also being highly efficient in operation.

Another important object of this invention is to provide an improved hay mowing rig especially adapted to be transported by and driven from the propelling motor of a tractor or the like, and which is operable with utmost safety due to the provision of automatic safety releases for interrupting the power transmission or for permitting the attachment as a whole to swing away from the path of cutting, whenever abnormal obstructions are encountered.

A further important object of my invention is to provide an improved hay, grain and weed mowing unit which is exceptionally sturdy in construction, all parts of which are well protected against possible damage, which may be operated with minimum power consumption, and which embodies durable bearings adapted to be maintained in abundantly lubricated condition at all times.

Still another important object of the invention is to provide an improved hay mower attachment for power driven vehicles, which is conveniently operable at several speeds to effectively cut various types of hay at either high or low propelling speeds, and which may be readily manipulated from the driver's seat of the tractor to perform various functions.

An additional important object of this invention is to provide an improved mower assemblage having a rugged one-piece main frame capable of being quickly mounted upon and propelled by various kinds of farm tractors; which may also be associated with hydraulic and other power lifts embodied in such tractors; and which may furthermore be just as quickly detached from the propelling unit.

Another important object of the present invention is to provide an improved lightweight mowing accessory for traction engines or the like, which may be easily handled or manipulated, and which may also be manufactured and sold at moderate cost for diverse uses such as mowing various kinds of hay, cutting weeds, or for similar purposes.

A more specific object of my present invention is to provide various improvements over the mower attachment shown in my prior Patent No. 2,335,510, granted November 30, 1943, whereby the flexibility, utility, safety and effectiveness of such devices is greatly enhanced.

These and other objects and advantages of the present invention will be apparent from the following description.

A clear conception of the various features constituting the present improvement, and of the mode of constructing and operating a typical mower attachment embodying the same, may be had by referring to the drawings accompanying and forming a part of this specification wherein like reference characters designate the same or similar parts in the various views.

Fig. 1 is a perspective view looking toward the rear of a typical farm tractor having one of my improved mower attachments applied thereto, the mower bar being shown in inactive or elevated position and some detailed parts having been omitted;

Fig. 2 is a considerably enlarged fragmentary perspective view of the upper portion of my improved mower attachment which is associated directly with the tractor draw-bar and power take-off;

Fig. 3 is a fragmentary perspective view of the farm tractor and mower attachment, drawn to a scale somewhat similar to that of Fig. 1, but showing the mower bar in active or lowered position;

Fig. 4 is an enlarged fragmentary sectional view showing the safety release for the mower attachment, the section being taken perpendicular to the draw-bar;

Fig. 5 is an enlarged longitudinal section through the safety release clutch for the mower drive; and Fig. 6 is an enlarged central sectional view showing the interior of the multi-speed gear box for the mower.

While the improved mower attachment has been shown and described herein as having been associated with a particular type of farm tractor, it is not my desire or intent to thereby unnecessarily restrict the scope or utility of the new features; and it is also contemplated that specific descriptive terms employed herein be given the broadest possible interpretation consistent with the disclosure.

Referring to the drawing, the typical farm tractor shown in Figs. 1 and 3, comprises in general a sturdy frame and power transmission housing 9 supported at the rear by a pair of drive wheels 10 and having a rear power take-off 11 and a transverse horizontal draw-bar 12 associated therewith. The power take-off 11 is connected as usual with the traction wheel propelling mechanism located within the housing 9 and which is adapted to be driven by the tractor motor; and the draw-bar 12 is preferably pivotally suspended from the housing frame 9 by opposite side arms 14 having lifting and lowering rods 15 secured thereto as illustrated in Figs. 2 and 3. These rods 15 may be hydraulically actuated and are operable from the driver's seat 16 of the tractor, to raise or lower the draw-bar 12 and to lock the latter in any desired position of adjustment; and the draw-bar 12 is provided with a series of implement attaching holes 17, preferably extending from one end to the other thereof.

The improved mower attachment constituting my present improvement, consists primarily of a rigid tubular main frame 19 which is normally fixedly attachable to any selected hole 17 of the draw-bar 12 by an attaching pin or bolt 20 coacting with an integral flange 21 of the frame 19 and by a safety latch 22 having spaced plates 23 embracing the draw-bar 12 and coacting with a curved quadrant bar 24 also formed integral with the frame 19; an elongated mower bar 26 tiltably and swingably suspended from the lower end of the frame 19 and having thereon fixed teeth 27 with which the teeth of a reciprocable cutter bar or blade 28 are cooperable to produce the mowing action; a driving shaft 30 for the cutter blade 28 having one end detachably connectible to the power take-off 11 by a universal coupling 31 while its opposite end is drivingly cooperable with an eccentric or crank pin 32 through speed-changing gearing confined in a gear box 33 firmly secured to the frame flange 21 and its medial portion is provided with a safety clutch 34, the crank pin 32 being operatively connected to the cutter bar 28 by a connecting rod 35; and a pair of levers 37, 38 operable from the driver's seat 16 for tilting the mower bar 26 at will, and for controlling the speed of rotation of the cutter actuating crank pin 32, respectively.

The sturdy one-piece frame 19 of the improved mower unit, besides having the flange 21 and quadrant bar 24 formed integral with its long tubular body, is provided at its upper extremity with a fork 40 carrying a detachable pin 41 which is flexibly connected to the tractor housing 9 by means of a bracing link 42, coupling 43, and tension spring 44, and the end 39 of the link nearest the coupling 43 may be connected to the draw-bar 12, by another tension spring 45 having end hooks 12', 39' coacting with loops on the interconnected parts, and which resiliently supports the whole mower unit, as shown in detail in Fig. 2. The quadrant bar 24 of the main frame 19 is curved about the axis of the attaching bolt 20 as a center, and the free end of the bar 24 is welded or otherwise firmly secured to the lower end of a lever positioning segment 48 the upper rear end of which is rigidly attached to the frame 19 beneath the fork 40 by a U-bolt 49, while the upper medial portion of this segment 48 is notched on its opposite sides for cooperation with the control levers 37, 38 as illustrated.

The main frame 19 is additionally provided with a cutter elevating and lowering bell-crank 50 coacting with a pivot pin 51 having its lower end curved toward and formed integral with the tubular frame body, as clearly shown in Fig. 2; one arm of this bell-crank 50 having a series of openings 52 selectively attachable to the tractor housing 9 with the aid of a flexible cable 53, and the other arm being provided with another series of openings 54 which are selectively attachable to the lower free end of the frame 19 by means of a brace 55 in order to permit the bar 26 to rise when hitting an obstruction, see Figs. 1, 2 and 3. The tubular body of the main frame 19 is held firmly in normal operating position across the path of a wheel 10, but may be automatically released and swung rearwardly into alinement with the central plane of the tractor upon release of the safety catch 22 in case an abnormal obstruction is encountered by the lower frame end or by the mower bar 26; and the frame 19 with its associated parts may be adjusted as a unit to various positions along the transverse draw-bar 12 without undesirably stressing its driving connections with the tractor or interfering with the automatic functioning of the safety release or frictional ball latch 22 of Fig. 4.

The mower bar 26 is pivotally suspended from the lower free end of the tubular frame 19 by a U-shaped bracket 57 the depending flanges of which are secured to the bar 26 by a pivot pin 58 and the upper portion of which is swingably supported on a pivot bearing 59 the central axis of which is disposed approximately perpendicular to the axis of the pin 58; and the U-shaped bracket 57 has a bearing shoe 60 for the frame 19 and bar 26 associated therewith and adapted to ride along the ground. This shoe 60 is fastened to the bracket 57 and is resiliently connected to a hook and lug 61 associated with the medial portion of the frame 19 by a tension spring 62; and the pivotal mounting of the cutter assemblage is such that the bar 26 may be disposed either in upright or inactive position as in Fig. 1, or in approximately horizontal or active position as in Fig. 3. The cutter bar 28 of the mower may be drivingly connected to the lower end of the connecting rod 35 in such manner, that when the bar 26 is in active position, the knife will be rapidly reciprocated; whereas when the bar 26 is elevated to inactive position, the cutter blade will not move.

The cutter blade 28 and mower bar 26 are adapted to be tilted up or down relative to the plane of cutting and in unison, with the aid of the hand lever 37 which is secured to an inclined shaft 64 the upper end of which is journalled in the lower front portion of the segment 48, as clearly illustrated in Fig. 2, while its lower end may be operatively connected to the mower bar 26, in a manner similar to that shown in detail in my prior Patent No. 2,335,510, granted November 30, 1943. The lever 37 is operable from the driver's seat 16 and is cooperable with any of a series of notches 65 formed in the segment 48 to lock it in adjusted position, and the lower extremity of the shaft 64 is cooperable with the mower bar so that rearward swinging of the lever 37 will tilt the mower bar 26 upwardly whereas forward swinging thereof will tilt the cutter bar downwardly more or less as desired. When the bar 26 has been swung upwardly about the pivot pin 58 to its maximum extent, it may be additionally retained in such position with the aid of a safety rod 66 having one end swingably attached to an eye 67 on the frame 19 and having its opposite end provided with a hook 68 insertible in an opening 63 in the bar 26 as shown in Fig. 1.

As previously indicated, the mower knife 28 is operable at several speeds by the revolving crank pin 32 which is driven from the power take-off 11 of the tractor through the driving shaft 30 and gear box assembly 33. The driving shaft 30 is telescopic or variable in length in order not to interfere with and to facilitate application of the mower attachment to various types of tractors, and so as to also permit the safety latch 22 to function properly; and the change speed gearing within the gear box 33 is manipulable from the driver's seat 16 with the aid of the hand lever 38 the lower end of which is swingably suspended from the frame segment 48 by a pin 70 and the upper portion of which is cooperable with either of three notches 71 in the segment 48. The midportion of the lever 38 is connected to a gear shift lever 72 by a rigid link 73 as illustrated in Fig. 2, and the variable speed gearing which is housed within the gear box 33 may be of any suitable type, or as shown in Fig. 6.

As shown in Fig. 6, the gear box 33 has a removable cover 69 normally held in place by cap screws 74 and contains a set of laterally spaced high and low speed spur gears 75, 76 adapted to be shifted along a spline 77 carried by the driven shaft 78, by means of a shifting fork 79 which is operable by the lever 72. The end of the driving shaft 30 which extends into the gear box 33 has a set of adjoining high and low speed spur gears 81, 82 fixedly attached thereto by a key, 83, and the ends of the shafts 30 and 78 which are housed within the gear box 33 are journalled in ball-bearings 84 as shown, while the housing is normally provided with an abundance of lubricant. The cutter actuating crank pin 32 is operable by the driven shaft 78, and when the lever 38 is actuated to position it in the central notch 71, the spaced gears 75, 76 will not engage either of the adjoining gears 81, 82; whereas shifting of the lever 38 into the rear notch 71 will cause the gears 75, 81 to mesh for high speed driving of the cutter 28, and disposition of this lever 38 in the front notch 71 will cause the gears 76, 82 to mesh for slow speed driving of the knife.

The construction and functioning of the safety release catch 22 for the frame 19 should be clearly apparent from Fig. 4 wherein the latching ball 85 is normally frictionally retained within a V-notch 86 in the frame arm 24 by a spring 87 and a screw 97, and the plates 23 are free to be slid along the draw-bar 12 when applying the attachment to a tractor. The construction of the safety release for the cutter drive is shown in Fig. 5 and comprises a driving clutch member 88 secured as by rivets 98 within the clutch casing 34 which is adapted to be driven by the power take-off of the tractor through the universal connection 31; a driven clutch member 89 coacting with the member 88 along radial undulations or serrations 90 and being slidable along an approximately square shaft section 91 having screw-threaded corners 92; and a compression spring 93 surrounding the shaft section 91 and coacting at one end with the member 89 while its opposite end reacts against a spring tension adjusting nut 94 coacting with the threaded corners 92. The square shaft section 91 telescopes within a square hole in the shaft 30, and the member 89 has a square hole slidably engaging this shaft section but the member 88 is free to rotate about the section 91. Whenever the attaching pin or bolt 20 is withdrawn and the supporting flange 21 of the frame 19 is shifted to a new location along the draw-bar 12, the square shaft section 91 slides within the hollow shaft 30 and thereby varies the length of the composite driving shaft which, however, is free to swing about the universal joint or connection 31 so as to prevent possible binding while the bolt 20 is being transferred to a different receiving hole 17.

When the various parts of my improved mower attachment have been properly constructed as herein described, the attachment may be fastened as a unit to the tractor draw-bar 12 and housing 9, by merely pivotally attaching the supporting bracket 21 to a selected opening 17 with the aid of the pivot bolt 20 so that the safety latch 22 coacts with the quadrant arm 24 as shown in Figs. 2 and 4, and by thereafter attaching the front end of the spring 44 to the tractor housing 9 and drivingly applying the universal connection 31 of the unit to the power take-off 11. The elongated frame 19 of the attachment will then be resiliently supported by the draw-bar 12 and spring 45, and may be raised or lowered bodily with this draw-bar in a well known manner by raising or lowering the rods 15 connected to the suspension arms 14. When thus normally suspended from the draw-bar 12, the frame 19 will extend downwardly and laterally beyond the rear of one of the tractor drive wheels 10 as illustrated in Figs. 1 and 3; and the mower bar 26 may be elevated into inactive position as in Fig. 1, or lowered into active position as in Fig. 3, and locked in these and other intermediate lowered or active positions by manipulating the draw-bar lifting and lowering mechanism which causes the bell-crank 50 to function.

Whenever the tractor motor is operating and regardless of whether the tractor is being propelled or is stationary, the power take-off 11 will function to revolve the mower driving shaft 30; and by manipulating the control lever 38, the crank pin 32 may either be disconnected from the drive shaft 30, or caused to revolve at a selected speed. Whenever the mower bar 26 is lowered while the crank pin 32 is revolving, the cutter blade 28 will be reciprocated at the selected speed, and the lever 38 may be locked in any desired position of adjustment by causing it to coact with the corresponding notch 71 of the frame segment 48. If the tractor is advanced after the cutter blade 28 has been thus set in motion, the shoe 60 will normally slide along the ground and the mower bar will travel in spaced relation to the ground and will coact with the reciprocating blade 28 to mow down hay, grain or weeds disposed within its path of travel.

In case the knife blade 28 encounters an abnormal obstruction of a type which cannot lift the bar 26 by swinging it about its pivot 58 away from the ground, the safety clutch members 88, 89 will function to prevent possible breakage of driving elements, by permitting ratchet slippage between the power take-off and the shaft 30, until the operator has had an opportunity to interrupt the drive and to remove the obstruction. In the event that the lowered bar 26 or frame 19 encounter an obstruction tending to disrupt the pivot bolt 20, then the safety latch 22 will automatically function to permit the entire mower unit to swing rearwardly into the path of travel of the tractor without causing breakage of parts. The universal connection 31 and the springs 44, 45, 62 and flexible cable 53 provide sufficient flexibility to permit such swinging of the unit, and these resilient and flexible connecting and attaching elements also eliminate excess play and resultant rattling of parts. After the safety latch 22 has functioned, the operator should remove the obstruction and restore the mower attachment to normal operating position as depicted in Figs. 1, 2 and 3.

From the foregoing detailed description, it should be apparent that my present invention in fact provided a simple but very durable mower attachment operable at multispeeds and which is readily cooperable with tractors of various types to effectively perform its intended functions. The one-piece sturdy frame 19 is resiliently supported by the vertically swingable transverse draw-bar 12 and by the tension spring 45 so that the mower bar 26 will float when riding over wet and uneven ground, and the lever 37 is conveniently manipulable from the driver's seat 16 so as to either tilt the mower bar 26 up or down, while the draw-bar lift may be operated to lower or raise the cutter into various operative positions. If the cutting blade 28 becomes jammed by an obstruction, the clutch 34 will slip and relieve the driving parts from undue stress; and in case the frame 19 or mower bar 26 meets an abnormal obstruction, then the safety latch 22 will permit the entire frame 19 to swing out of the way of the obstruction by virtue of the sliding coaction of the arcuate arm 24 with the guide plates 23. The lever 38 may also be conveniently manipulated from the driver's seat 16 to either stop the mower blade 28 or to reciprocate it at several selected speeds with the aid of the gearing confined within the gear box 33, thus making the unit extremely flexible in its adaptations and efficient in use.

While the improved mower attachment specifically disclosed herein has proven highly successful and satisfactory in actual use, it should be understood that it is not my desire to limit the invention to the exact details of construction and operation shown and described, since various modifications within the scope of the appended claims may occur to persons skilled in the art.

I claim:

1. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral flange intermediate its upper and lower ends provided with a pivot bolt attachable to the draw-bar at various localities and also having an integral arm intermediate said ends extending across the draw-bar remote from said pivot bolt, guide plates carried by the draw-bar and coacting with said arm to steady said frame and to permit swinging thereof about said pivot bolt when subjected to abnormal pressure, a mower bar and cutter assemblage swingably suspended from the lower end of said frame, and means carried by said frame for drivingly connecting the mower cutter with the power take-off of the tractor.

2. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral flange intermediate its upper and lower ends provided with a pivot bolt attachable to the draw-bar at various localities and also having an integral arm intermediate said ends extending across the draw-bar remote from said pivot bolt, guide plates carried by the draw-bar and coacting with said arm to steady said frame and to permit swinging thereof about said pivot bolt when subjected to abnormal pressure, a mower bar and cutter assemblage swingably suspended from the lower end of said frame, means carried by said frame for drivingly connecting the mower cutter with the power take-off of the tractor, and a resilient connection between the upper end of said frame and the tractor.

3. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral flange intermediate its upper and lower ends provided with an upright pivot bolt attachable to the draw-bar at various localities and also having an integral arcuate arm intermediate said ends extending forwardly across the draw-bar remote from said pivot bolt, guide plates and a latch carried by the draw-bar and frictionally engaging said arm to steady said frame and to permit swinging thereof about said pivot bolt when subjected to abnormal pressure, a mower bar and cutter assemblage swingably suspended from the lower end of said frame, means suspended directly from said frame flange for drivingly connecting the mower cutter with the power take-off of the tractor, and means for resiliently connecting the upper end of said frame to the tractor and the draw-bar.

4. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral flange intermediate its upper and lower ends provided with an upright pivot bolt attachable to the draw-bar at various localities and also having an integral arm intermediate said ends extending across the draw-bar remote from said pivot bolt, guide plates carried by the draw-bar and coacting with said arm to steady said frame and to permit swinging thereof about said pivot bolt when subjected to abnormal pressure, a mower bar and cutter assemblage swingably suspended from the lower end of said frame, means carried by said frame for drivingly connecting the mower cutter with the power take-off of the tractor, a notched segment carried by the free end of said frame arm, and a control lever for said connecting means cooperable with said segment to control the operation of said mower cutter.

5. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral horizontal flange intermediate its upper and lower ends provided with an upright pivot bolt attachable to the draw-bar at various localities and also having an integral arm intermediate said ends extending across the draw-bar remote from and curved about said pivot bolt as a center, guide plates carried by the draw-bar and frictionally coacting with said arm to steady said frame and to permit swinging thereof about said pivot bolt when subjected to abnormal pressure, a mower bar and cutter assemblage swingably suspended from the lower end of said frame, and means including variable speed mechanism suspended from said frame at said flange for drivingly connecting the mower cutter with the power take-off of the tractor.

6. In a mower attachment for a tractor having an elongated transverse draw-bar and a power take-off near the draw-bar, an elongated unitary tubular frame extending upwardly above the draw-bar and downwardly behind and beyond a wheel of the propelling tractor, said frame having an integral flange intermediate its upper and lower ends provided with a pivot bolt attachable to the draw-bar and also having an integral arm intermediate said ends extending across the draw-bar remote from and curved about said pivot bolt as a center, guide plates carried by the draw-bar remote from said axis and frictionally coacting with said arm to steady said frame and to permit swinging thereof about said pivot bolt when subjected to abnomal pressure, a mower bar and cutter assemblage swingably suspended from the lower end of said frame, means carried directly by said frame for drivingly connecting the mower cutter with the power take-off of the tractor, and spring means resiliently connecting the upper end of said frame to the tractor and to the draw-bar.

7. In a mower attachment for a tractor having an elongated transverse draw-bar and a power take-off near the draw-bar, an elongated unitary frame extending upwardly above the draw-bar and downwardly behind and beyond a wheel of the propelling tractor, said frame having an integral horizontal flange intermediate its upper and lower ends provided with a pivot bolt attachable to the draw-bar and also having an integral longitudinally curved arm intermediate said ends extending across the draw-bar remote from and extending partially around said pivot bolt, parallel guide plates carried by the draw-bar remote from said flange and frictionally coacting with said arm to steady said frame and to permit swinging thereof about said pivot bolt when subjected to abnormal pressure, a mower bar and cutter assemblage swingably suspended from the lower end of said frame, means carried by said frame for drivingly connecting the mower cutter with the power take-off of the tractor, control means for said connecting means carried by said frame, and a resilient connection between the upper end of said frame and the tractor and draw-bar.

JOSEPH F. HANSEN.

REFERENCES CITED

The following references are of record in the file of this patent:

UNITED STATES PATENTS

| Number | Name | Date |
|---|---|---|
| 1,842,633 | Sparks | Jan. 26, 1932 |
| 1,915,548 | Paul | June 27, 1933 |
| 2,044,169 | Hilblom | June 16, 1936 |
| 2,248,332 | Budelier et al. | July 18, 1941 |
| 2,269,980 | MacDonald | Jan. 13, 1942 |
| 2,269,982 | Mott | Jan. 13, 1942 |
| 2,275,259 | Johnson et al. | Mar. 3, 1942 |
| 2,354,710 | Simpson et al. | Aug. 1, 1944 |
| 2,490,894 | Zink et al. | Dec. 13, 1949 |